United States Patent [19]
Moon

[11] Patent Number: 6,111,897
[45] Date of Patent: Aug. 29, 2000

[54] MULTIPLEXING/DEMULTIPLEXING APPARATUS IN DIGITAL COMMUNICATION SYSTEM WITH VARIABLE FRAME STRUCTURE AND METHOD OF CONTROLLING THE SAME

[75] Inventor: Hee Chul Moon, Kyoungki-do, Rep. of Korea

[73] Assignee: Hyundai Electronics Industries Co., Ltd., Kyoungki-do, Rep. of Korea

[21] Appl. No.: 09/037,943

[22] Filed: Mar. 10, 1998

[30] Foreign Application Priority Data

May 10, 1997 [KR]  Rep. of Korea ...................... 97-18092

[51] Int. Cl.[7] ................................. H04J 3/04; H04J 3/07
[52] U.S. Cl. ............................................. 370/535; 370/505
[58] Field of Search ...................................... 370/535, 471, 370/474, 463, 585, 470, 509, 516; 375/362, 371

[56] References Cited

U.S. PATENT DOCUMENTS

| | | | |
|---|---|---|---|
| 4,658,152 | 4/1987 | Walters | 370/84 |
| 4,845,711 | 7/1989 | Lefort et al. | 370/102 |
| 5,091,907 | 2/1992 | Wettengel | 370/102 |
| 5,623,493 | 4/1997 | Kagemoto | 370/397 |

Primary Examiner—Alpus H. Hsu
Assistant Examiner—Duc Ho
Attorney, Agent, or Firm—Helfgott & Karas, PC

[57] ABSTRACT

A multiplexing/demultiplexing apparatus in a digital communication system with a variable frame structure and a method of controlling the same. The apparatus comprises a first FIFO unit for buffering data inputted at a fixed speed, a first write controller for outputting a first write address to the first FIFO unit in response to a first data input clock, a first read controller for outputting a first read address to the first FIFO unit in response to a first data output clock, a stuff/delete determination unit for generating stuff and delete indication signals, a multiplexer for multiplexing output data from the first FIFO unit to output frame data, a demultiplexer for demultiplexing the frame data from the multiplexer, a second write controller for generating a second write address in response to a write enable signal from the demultiplexer and a second data output clock, second read controller for generating a second read address in response to a second data input clock, a clock adjustment unit for outputting the second data input clock to the second read controller, and a second FIFO unit for storing output data from the demultiplexer in response to the second write address from the second write controller and outputting the stored data in response to the second read address from the second read controller.

9 Claims, 7 Drawing Sheets

MULTIPLEXING/DEMULTIPLEXING APPARATUS IN DIGITAL COMMUNICATION SYSTEM WITH VARIABLE FRAME STRUCTURE AND METHOD OF CONTROLLING THE SAME

BACKGROUND OF THE INVENTION

1. Field of the Invention

The present invention relates in general to the variable frame structure-based frequency adjustment in a digital communication field such as a satellite broadcast, a high definition television (HDTV), etc., and more particularly to a multiplexing/demultiplexing apparatus in a digital communication system with a variable frame structure and a method of controlling the same, in which different clocks are used at input and output stages by virtue of a general oscillator without deriving a data output clock from a data input clock, thereby preventing a transmission signal from being degraded in quality due to a phase noise or jitter.

2. Description of the Prior Art

Generally, a phase locked loop is adapted to extract a stable frequency signal and detect a phase of an input signal. Recently, according to developments in semiconductor techniques, the phase locked loop has been applied to the necessaries of life such as radio, TV, etc. and a control system such as a servo motor, as well as a communication system. Such a conventional phase locked loop is shown in block form in FIG. 2. As shown in this drawing, the conventional phase locked loop comprises a phase comparator 1, a loop filter 2 having a signal input terminal connected to a signal output terminal of the phase comparator 1, and a voltage controlled oscillator (VCO) 3 having a signal input terminal connected to a signal output terminal of the loop filter 2, and a signal output terminal connected to a feedback input terminal of the phase comparator 1.

In the conventional phase locked loop, the phase comparator 1 detects a phase difference between input and output signals, which is then passed through a low pass filter (LPF) of the loop filter 2. An output frequency of the VCO 3 is adjusted upward or downward according to the level of a control voltage from the loop filter 2. For example, in the case where the output frequency of the VCO 3 is higher than an input frequency, it is earlier in phase than the input frequency. In this case, the control voltage from the loop filter 2 is reduced, resulting in a reduction in the output frequency of the VCO 3. As a result, the output frequency of the VCO 3 becomes equal to the input frequency.

However, in the above-mentioned conventional phase locked loop, a data output clock is derived from a data input clock and then passed through the LPF. At this time, the data output clock is subjected to a natural phase noise, resulting in a degradation in the quality of a transmission signal.

SUMMARY OF THE INVENTION

Therefore, the present invention has been made in view of the above problem, and it is an object of the present invention to provide a multiplexing/demultiplexing apparatus in a digital communication system with a variable frame structure and a method of controlling the same, in which a frame is not fully fixed but partially varied by virtue of a general oscillator, in such a manner that a data region of the frame can be extended if a data input clock is relatively large and reduced if the data input clock is relatively small, so that an overflow or underflow can be avoided, thereby preventing a transmission signal from being degraded in quality due to a phase noise or jitter, applied from the data input clock to a data output clock.

In accordance with one aspect of the present invention, there is provided a multiplexing apparatus in a digital communication system with a variable frame structure, comprising FIFO means for buffering data inputted at a fixed speed and outputting the buffered data when the current region is a data region of a frame; write control means for outputting a write address to said FIFO means in response to a data input clock; read control means for outputting a read address to said FIFO means in response to a data output clock; stuff/delete determination means for generating a stuff indication signal and a delete indication signal in response to said write address from said write control means, said read address from said read control means and a frame synchronous signal, said stuff indication signal indicating the extension of said data region of said frame, said delete indication signal indicating the reduction of said data region of said frame; and multiplexing means for multiplexing output data from said FIFO means to output frame data, said multiplexing means being further adapted to output a read control signal to said read control means in response to said stuff and delete indication signals from said stuff/delete determination means to control said read address from said read control means.

In accordance with another aspect of the present invention, there is provided a demultiplexing apparatus in a digital communication system with a variable frame structure, comprising demultiplexing means for demultiplexing frame data from a multiplexing apparatus, said demultiplexing means being further adapted to determine whether the current region is a data region of a frame and generate a write enable signal in accordance with the determined result, said write enable signal being high in level when the current region is said data region of said frame; write control means for generating a write address in response to said write enable signal from said demultiplexing means and a data output clock; read control means for generating a read address in response to a data input clock; clock adjustment means for outputting said data input clock to said read control means in response to said write address from said write control means, said read address from said read control means and a frame synchronous signal; and FIFO means for storing output data from said demultiplexing means in response to said write address from said write control means and outputting the stored data in response to said read address from said read control means.

In accordance with a further aspect of the present invention, there is provided a multiplexing/demultiplexing apparatus in a digital communication system with a variable frame structure, comprising first FIFO means for buffering data inputted at a fixed speed and outputting the buffered data when the current region is a data region of a frame; first write control means for outputting a first write address to said first FIFO means in response to a first data input clock; first read control means for outputting a first read address to said first FIFO means in response to a first data output clock; stuff/delete determination means for generating a stuff indication signal and a delete indication signal in response to said first write address from said first write control means, said first read address from said first read control means and a frame synchronous signal, said stuff indication signal indicating the extension of said data region of said frame, said delete indication signal indicating the reduction of said data region of said frame; multiplexing means for multiplexing output data from said first FIFO means to output frame data, said multiplexing means being further adapted to output a read control signal to said first read control means in response to said stuff and delete indication signals from said stuff/delete determination means to control said first read address from said first read control means; demultiplexing means for demultiplexing said frame data from said multiplexing means, said demultiplexing means being further adapted to determine whether the current region is said data region of said frame and generate a write enable signal in accordance with the determined result, said write enable signal being high in level when the current region is said data region of said frame; second write control means for generating a second write address in response to said write enable signal from said demultiplexing means and a second data output clock; second read control means for generating a second read address in response to a second data input clock; clock adjustment means for outputting said second data input clock to said second read control means in response to said second write address from said second write control means, said second read address from said second read control means and said frame synchronous signal; and second FIFO means for storing output data from said demultiplexing means in response to said second write address from said second write control means and outputting the stored data in response to said second read address from said second read control means.

In accordance with yet another aspect of the present invention, there is provided a method of controlling multiplexing and demultiplexing operations in a digital communication system with a variable frame structure, comprising the first step of generating a first write address in response to a first data input clock to write input data into a first FIFO unit and generating a stuff indication signal and a delete indication signal in response to said first write address, a first read address and a frame synchronous signal; the second step of generating a read control signal in response to said stuff and delete indication signals and generating said first read address in response to the generated read control signal and a first data output clock to read the written data from said first FIFO unit; the third step of multiplexing the data read from said first FIFO unit to output frame data; the fourth step of demultiplexing said frame data; the fifth step of generating a second write address in response to a write enable signal and a second data output clock to write the demultiplexed data into a second FIFO unit; the sixth step of generating a second data input clock in response to said second write address, a second read address and said frame synchronous signal; and the seventh step of generating said second read address in response to said second data input clock to read the written data from said second FIFO unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
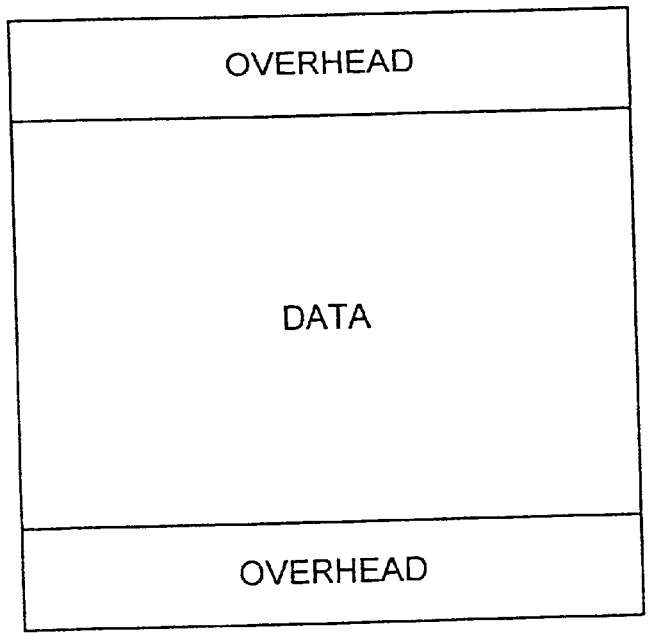
FIG. 1a is a view illustrating a conventional frame structure.
Figure 1B:
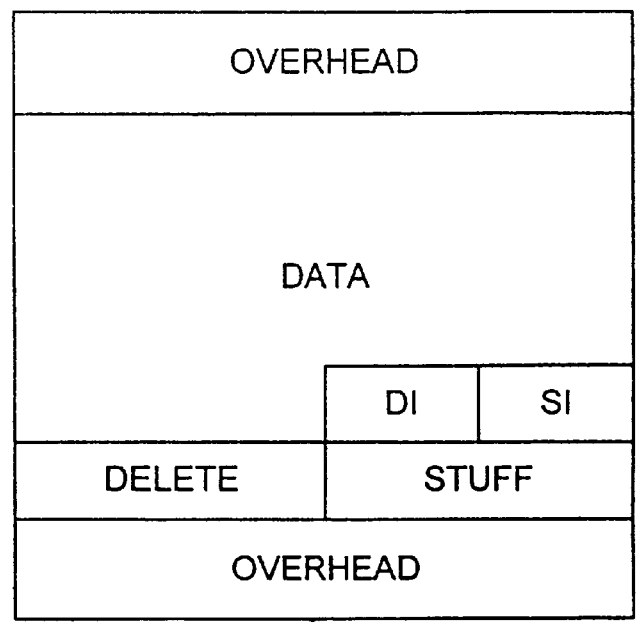
FIG. 1b is a view illustrating a variable frame structure of the present invention.
Figure 2:
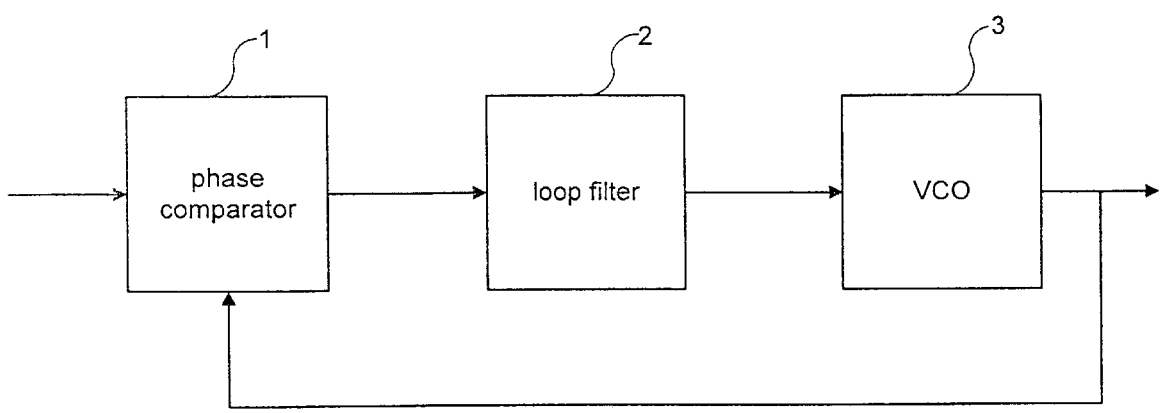
FIG. 2 is a block diagram of a conventional phase locked loop.

FIG. 1b is a view illustrating a variable frame structure of the present invention. As shown in this drawing, a frame is composed of an overhead, main data, a stuff indication signal SI, a delete indication signal DI, a delete region and a stuff region. The stuff indication signal SI indicates the extension of a data region of the frame using a frame synchronous signal, and the delete indication signal DI indicates the reduction of a data region of the frame using the frame synchronous signal. The stuff region represents a data region stuffed by the stuff indication signal SI, and the delete region represents a data region deleted by the delete indication signal DI.

Generally, a Fin/Fout ratio of a fixed frame can be expressed by the following equation (1):

$$\frac{Fin}{Fout} = \frac{data\,(bit)}{data\,(bit) + overhead(bit)} \quad (1)$$

According to the present invention, a Fin/Fout ratio of a variable frame can be expressed by the following equation (2):

$$\frac{Fin}{Fout} = \frac{data\,(bit)}{data\,(bit) + overhead(bit) + SI/DI(bit) + delete(bit)} \quad (2)$$

In the above equation (2), a frequency offset, or Fin/Fout ratio is present because Fin and Fout have different frequency sources. An overflow occurs if the frequency offset is greater than $\alpha$, and an underflow occurs if the frequency offset is smaller than $\alpha$.

In the case where the frequency offset is greater than $\alpha$, further data is stuffed into the stuff region of the frame to prevent the overflow from occurring. To the contrary, in the case where the frequency offset is smaller than $\alpha$, data in the delete region of the frame is deleted to prevent the underflow from occurring.

Figure 3:
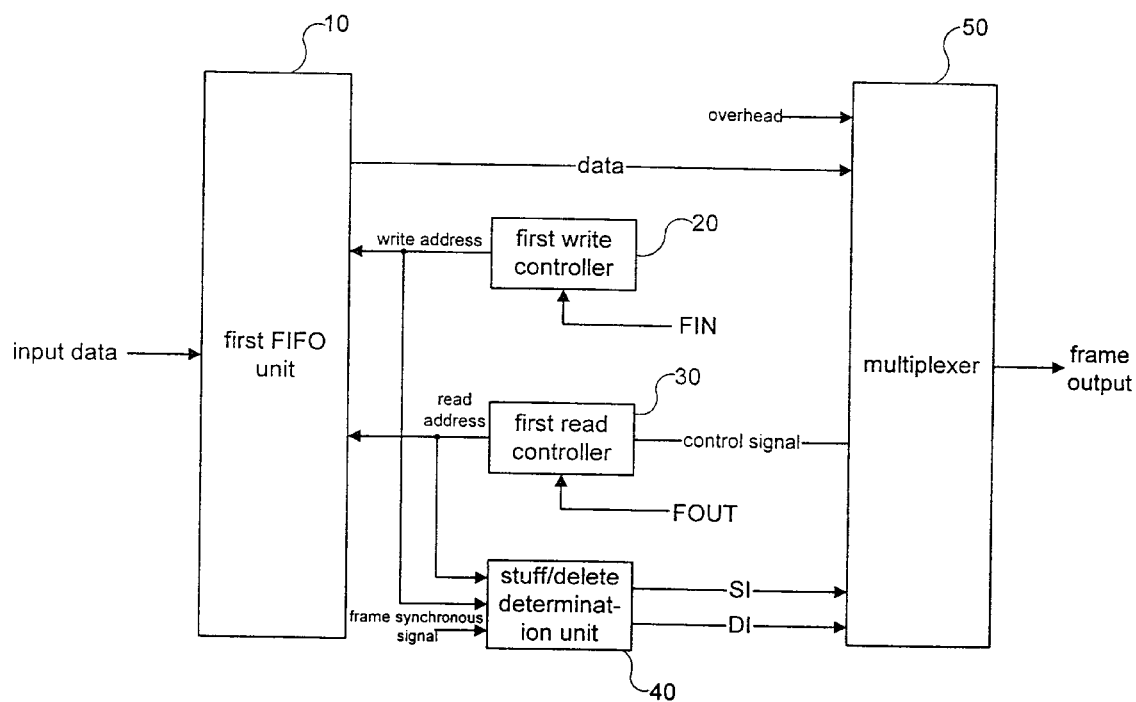
FIG. 3 is a block diagram of a multiplexing apparatus in a digital communication system with a variable frame structure in accordance with the present invention.

FIG. 3 is a block diagram of a multiplexing apparatus in a digital communication system with a variable frame structure in accordance with the present invention. As shown in this drawing, the multiplexing apparatus comprises a first first-in-first-out (FIFO) unit 10 for buffering data inputted at a fixed speed, a first write controller 20 for controlling a write operation of the first FIFO unit 10, a multiplexer 50 for multiplexing output data from the first FIFO unit 10 to output frame data, a first read controller 30 for controlling a read operation of the first FIFO unit 10 in response to a control signal from the multiplexer 50, and a stuff/delete determination unit 40 for outputting a stuff indication signal SI and a delete indication signal DI to the multiplexer 50 in response to a write address from the first write controller 20, a read address from the first read controller 30 and a frame synchronous signal which is periodically generated every frame.

When the current frame region is a data region, the first read controller 30 increases the read address. However, in the case where the current frame region is not the data region, the first read controller 30 does not increase the read address.

The control signal from the multiplexer 50 is determined in level according to the type of a frame and the stuff and delete indication signals SI and DI. For example, if (SI,DI)=(1,0), the control signal from the multiplexer 50 is high in level with respect to the data and stuff regions. Also, the control signal from the multiplexer 50 is high in level with respect to only the data region if (SI,DI)=(0,1) and with respect to the data and delete regions if (SI,DI)=(0,0). Noticeably, if a ratio of data input clock/data output clock is accurately α, (SI,DI)=(0,0) at all times. However, practically, because the frequency offset is naturally generated, the control signal from the multiplexer 50 is adjusted according to the state of the FIFO unit 10.

Figure 6:
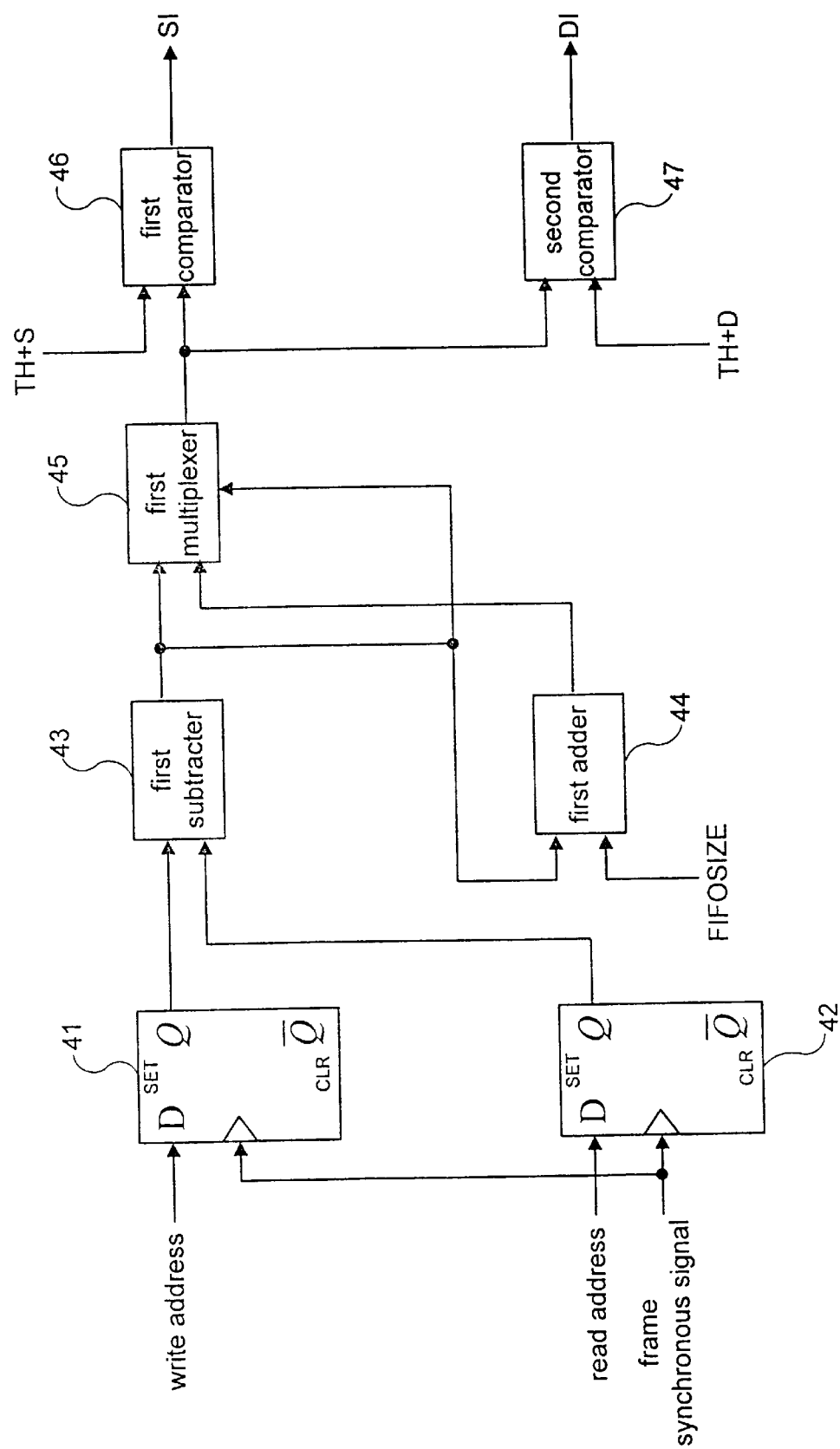
FIG. 6 is a detailed block diagram of a stuff/delete determination unit in FIG. 3.

FIG. 6 is a detailed block diagram of the stuff/delete determination unit 40 in FIG. 3. As shown in this drawing, the stuff/delete determination unit 40 includes a first flip-flop 41 for delaying the write address from the first write controller 20 in response to the frame synchronous signal, a second flip-flop 42 for delaying the read address from the first read controller 30 in response to the frame synchronous signal, a first subtracter 43 for obtaining a difference between output values from the first and second flip-flops 41 and 42, a first adder 44 for adding a FIFO size value to an output value from the first subtracter 43 if the output value from the first subtracter 43 is minus, a first multiplexer 45 for multiplexing the output value from the first subtracter 43 and an output value from the first adder 44, a first comparator 46 for comparing an output value from the first multiplexer 45 with a value TH+S (where, S is the number of bits in the stuff region of the frame) and outputting the stuff indication signal SI to the multiplexer 50 if they are the same, and a second comparator 47 for comparing the output value from the first multiplexer 45 with a value TH+D (where, D is the number of bits in the delete region of the frame) and outputting the delete indication signal DI to the multiplexer 50 if they are the same.

Although an input point of the write address from the write controller 20 is substantially earlier than that of the read address from the read controller 30, the first subtracter 43 may have a plus or minus value according to characteristics of the first and second flip-flops 41 and 42.

The first multiplexer 45 takes the output value from the first subtracter 43 if it is plus and the output value from the first adder 44 if it is minus.

Figure 4:
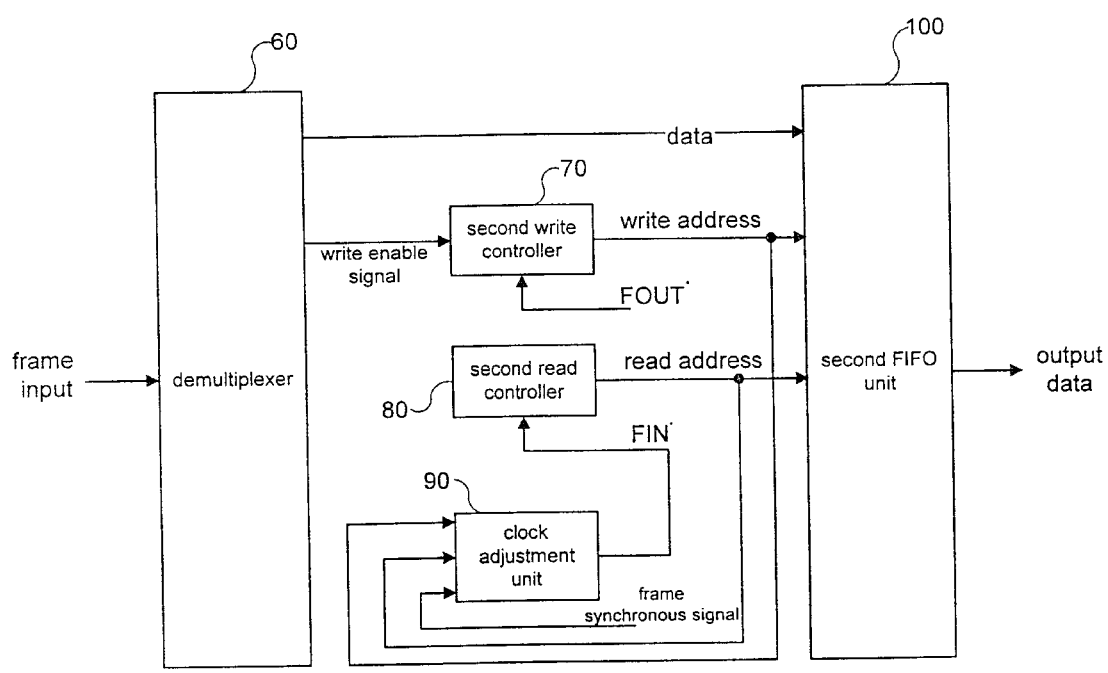
FIG. 4 is a block diagram of a demultiplexing apparatus in a digital communication system with a variable frame structure in accordance with the present invention.
Figure 5:
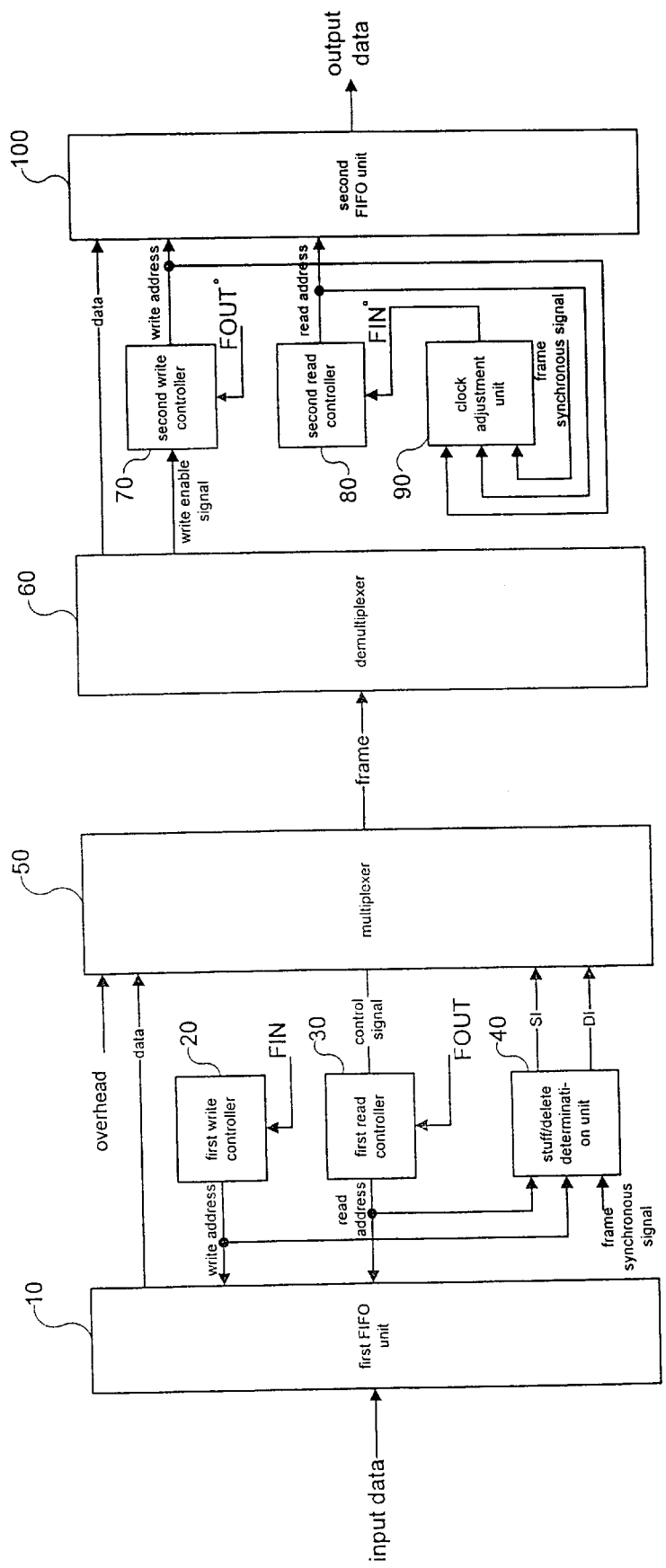
FIG. 5 is a block diagram of a multiplexing/demultiplexing apparatus in a digital communication system with a variable frame structure in accordance with the present invention.

FIG. 4 is a block diagram of a demultiplexing apparatus in a digital communication system with a variable frame structure in accordance with the present invention. As shown in this drawing, the demultiplexing apparatus comprises a demultiplexer 60 for demultiplexing the frame data from the multiplexer 50 in FIG. 3, a second FIFO unit 100 for delaying output data from the demultiplexer 60, a second write controller 70 for analyzing the stuff and delete indication signals SI and DI from the multiplexing apparatus in FIG. 3 in response to a write enable signal EN from the demultiplexer 60 and a signal Fout* and controlling a write operation of the second FIFO unit 100 in accordance with the analyzed result, and a second read controller 80 for controlling a read operation of the second FIFO unit 100 in response to a signal Fin*. The signal Fout* is in synchronization with a signal Fout in the multiplexing apparatus in FIG. 3. The signal Fin* is adjusted in frequency to avoid an overflow or underflow, and normally has the same frequency as that of a signal Fin in the multiplexing apparatus in FIG. 3.

The demultiplexing apparatus further comprises a clock adjustment unit 90 for outputting the signal Fin* to the second read controller 80 in response to a write address from the second write controller 70, a read address from the second read controller 80 and the frame synchronous signal which is periodically generated every frame.

Figure 7:
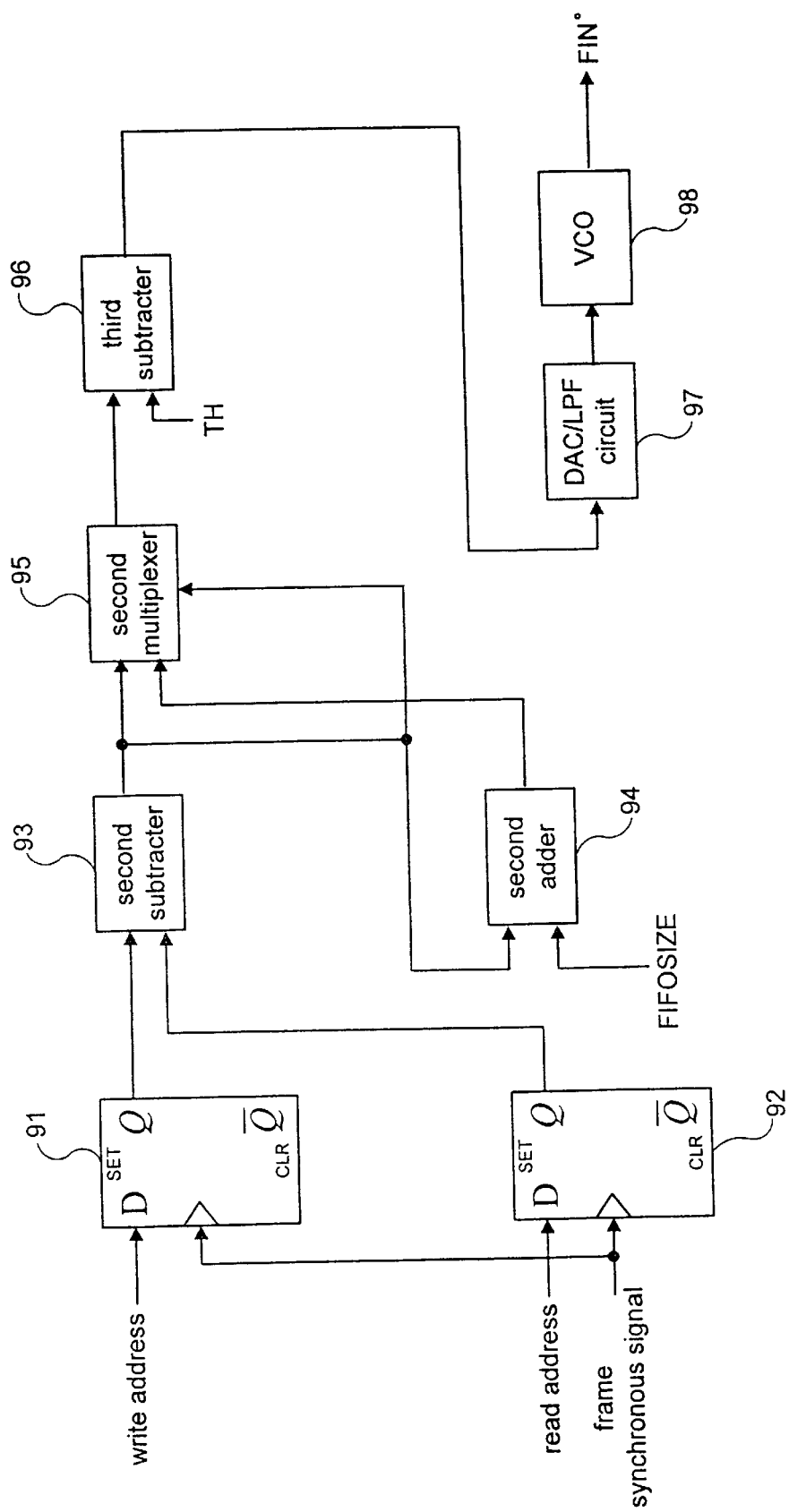
FIG. 7 is a detailed block diagram of a clock adjustment unit in FIG. 4.

FIG. 7 is a detailed block diagram of the clock adjustment unit 90 in FIG. 4. As shown in this drawing, the clock adjustment unit 90 includes a third flip-flop 91 for delaying the write address from the second write controller 70 in response to the frame synchronous signal, a fourth flip-flop 92 for delaying the read address from the second read controller 80 in response to the frame synchronous signal, a second subtracter 93 for obtaining a difference between output values from the third and fourth flip-flops 91 and 92, a second adder 94 for adding a FIFO size value to an output value from the second subtracter 93 if the output value from the second subtracter 93 is minus, a second multiplexer 95 for multiplexing the output value from the second subtracter 93 and an output value from the second adder 94, a third subtracter 96 for obtaining a difference between an output value from the second multiplexer 95 and a reference value TH, a digital/analog converter/low pass filter (DAC/LPF) circuit 97 for converting a digital output value from the third subtracter 96 into an analog value and passing a low-frequency component of the converted analog value, and a VCO 98 for outputting the signal Fin* to the second read controller 80 in response to an output voltage from the DAC/LPF circuit 97.

The operation of the multiplexing/demultiplexing apparatus with the above-mentioned construction in accordance with the present invention will hereinafter be described in detail.

First, in FIG. 3, the input data is stored in the first FIFO unit 10 in response to the write address from the first write controller 20. Also, the stuff/delete determination unit 40 outputs the stuff and delete indication signals SI and DI to the multiplexer 50 in response to the write address from the first write controller 20, the read address from the first read controller 30 and the frame synchronous signal. The multiplexer 50 outputs the control signal to the first read controller 30 in response to the stuff and delete indication signals SI and DI from the stuff/delete determination unit 40. In response to the control signal from the multiplexer 50, the first read controller 30 outputs the read address to the first FIFO unit 10 so that the data stored therein can be outputted to the multiplexer 50.

Then, the multiplexer 50 multiplexes the output data from the first FIFO unit 10 and outputs the resultant frame data to the demultiplexer 60 in FIG. 4.

In FIG. 4, the demultiplexer 60 demultiplexes the frame data from the multiplexer 50 in FIG. 3 and outputs the demultiplexed data to the second FIFO unit 100. The demultiplexer 60 also outputs the write enable signal EN to the second write controller 70. Then, the second write controller 70 outputs the write address to the second FIFO unit 100 in response to the write enable signal EN from the demultiplexer 60 and the signal Fout* so that the output data from the demultiplexer 60 can be stored therein.

On the other hand, the clock adjustment unit 90 outputs the signal Fin* to the second read controller 80 in response to the write address from the second write controller 70, the read address from the second read controller 80 and the frame synchronous signal. Then, the second read controller 80 outputs the read address to the second FIFO unit 100 in response to the signal Fin* from the clock adjustment unit 90 so that the data stored therein can be outputted.

As apparent from the above description, according to the present invention, the data output clock is derived not from the data input clock, but by the general oscillator, thereby preventing the transmission signal from being degraded in quality due to a phase noise or jitter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multiplexing apparatus in a digital communication system with a variable frame structure, comprising:

FIFO means for buffering data inputted at a fixed speed and outputting the buffered data when the current region is a data region of a frame;

write control means for outputting a write address to said FIFO means in response to a data input clock;

read control means for outputting a read address to said FIFO means in response to a data output clock;

stuff/delete determination means for generating a stuff indication signal and a delete indication signal in response to said write address from said write control means, said read address from said read control means and a frame synchronous signal, said stuff indication signal indicating the extension of said data region of said frame, said delete indication signal indicating the reduction of said data region of said frame; and multiplexing means for multiplexing output data from said FIFO means to output frame data, said multiplexing means being further adapted to output a read control signal to said read control means in response to said stuff and delete indication signals from said stuff/delete determination means to control said read address from said read control means.

2. A multiplexing apparatus in a digital communication system with a variable frame structure, as set forth in claim 1, wherein said stuff/delete determination means includes:

a first flip-flop for inputting said write address from said write control means at a rising edge of said frame synchronous signal;

a second flip-flop for inputting said read address from said read control means at said rising edge of said frame synchronous signal;

a subtracter for subtracting an output value from said second flip-flop from an output value from said first flip-flop;

an adder for adding a FIFO size value to an output value from said subtracter if said output value from said subtracter is minus;

a multiplexer for taking said output value from said subtracter if it is plus and an output value from said adder if it is minus;

a first comparator for comparing an output value from said multiplexer with the sum of a reference value and the number of bits in a stuff region of said frame and outputting said stuff indication signal to said multiplexing means if they are the same; and a second comparator for comparing said output value from said multiplexer with the sum of said reference value and the number of bits in a delete region of said frame and outputting said delete indication signal to said multiplexing means if they are the same.

3. A demultiplexing apparatus in a digital communication system with a variable frame structure, comprising:

demultiplexing means for demultiplexing frame data from a multiplexing apparatus, said demultiplexing means being further adapted to determine whether the current region is a data region of a frame and generate a write enable signal in accordance with the determined result, said write enable signal being high in level when the current region is said data region of said frame;

write control means for generating a write address in response to said write enable signal from said demultiplexing means and a data output clock;

read control means for generating a read address in response to a data input clock;

clock adjustment means for outputting said data input clock to said read control means in response to said write address from said write control means, said read address from said read control means and a frame synchronous signal; and FIFO means for storing output data from said demultiplexing means in response to said write address from said write control means and outputting the stored data in response to said read address from said read control means.

4. A demultiplexing apparatus in a digital communication system with a variable frame structure, as set forth in claim 3, wherein said clock adjustment means includes:

a first flip-flop for inputting said write address from said write control means at a rising edge of said frame synchronous signal;

a second flip-flop for inputting said read address from said read control means at said rising edge of said frame synchronous signal;

a first subtracter for subtracting an output value from said second flip-flop from an output value from said first flip-flop;

an adder for adding a FIFO size value to an output value from said subtracter if said output value from said subtracter is minus;

a multiplexer for taking said output value from said subtracter if it is plus and an output value from said adder if it is minus;

a second subtracter for subtracting a reference value from an output value from said multiplexer and outputting the subtracted result as a phase comparison value;

a digital/analog converter/low pass filter circuit for converting said phase comparison value from said second subtracter into an analog value and passing a low-frequency component of the converted analog value; and a voltage controlled oscillator for outputting said data input clock to said read control means in response to an output voltage from said digital/analog converter/low pass filter circuit.

5. A multiplexing/demultiplexing apparatus in a digital communication system with a variable frame structure, comprising:

first FIFO means for buffering data inputted at a fixed speed and outputting the buffered data when the current region is a data region of a frame;

first write control means for outputting a first write address to said first FIFO means in response to a first data input clock;

first read control means for outputting a first read address to said first FIFO means in response to a first data output clock;

stuff/delete determination means for generating a stuff indication signal and a delete indication signal in response to said first write address from said first write control means, said first read address from said first read control means and a frame synchronous signal, said stuff indication signal indicating the extension of said data region of said frame, said delete indication signal indicating the reduction of said data region of said frame;

multiplexing means for multiplexing output data from said first FIFO means to output frame data, said multiplexing means being further adapted to output a read control signal to said first read control means in response to said stuff and delete indication signals from said stuff/delete determination means to control said first read address from said first read control means;

demultiplexing means for demultiplexing said frame data from said multiplexing means, said demultiplexing means being further adapted to determine whether the current region is said data region of said frame and generate a write enable signal in accordance with the determined result, said write enable signal being high in level when the current region is said data region of said frame;

second write control means for generating a second write address in response to said write enable signal from said demultiplexing means and a second data output clock;

second read control means for generating a second read address in response to a second data input clock;

clock adjustment means for outputting said second data input clock to said second read control means in response to said second write address from said second write control means, said second read address from said second read control means and said frame synchronous signal; and second FIFO means for storing output data from said demultiplexing means in response to said second write address from said second write control means and outputting the stored data in response to said second read address from said second read control means.

6. A method of controlling multiplexing and demultiplexing operations in a digital communication system with a variable frame structure, comprising the steps of:

(a) generating a first write address in response to a first data input clock to write input data into a first FIFO unit and generating a stuff indication signal and a delete indication signal in response to said first write address, a first read address and a frame synchronous signal;

(b) generating a read control signal in response to said stuff and delete indication signals and generating said first read address in response to the generated read control signal and a first data output clock to read the written data from said first FIFO unit;

(c) multiplexing the data read from said first FIFO unit to output frame data;

(d) demultiplexing said frame data;

(e) generating a second write address in response to a write enable signal and a second data output clock to write the demultiplexed data into a second FIFO unit;

(f) generating a second data input clock in response to said second write address, a second read address and said frame synchronous signal; and (g) generating said second read address in response to said second data input clock to read the written data from said second FIFO unit.

7. A method of controlling multiplexing and demultiplexing operations in a digital communication system with a variable frame structure, as set forth in claim 6, wherein said step (a) includes the step of generating said stuff indication signal if a difference between said first write address and said first read address is greater than a threshold value and said delete indication signal if it is smaller than said threshold value.

8. A method of controlling multiplexing and demultiplexing operations in a digital communication system with a variable frame structure, as set forth in claim 6, wherein said step (a) includes the step of, if a ratio of said first data input clock to said first data output clock is greater than α, generating said stuff indication signal to stuff further data into a stuff region of a frame.

9. A method of controlling multiplexing and demultiplexing operations in a digital communication system with a variable frame structure, as set forth in claim 6, wherein said step (a) includes the step of, if a ratio of said first data input clock to said first data output clock is smaller than α, generating said delete indication signal to reduce data in a delete region of a frame.

* * * * *